United States Patent
Hey

(10) Patent No.: US 10,419,707 B2
(45) Date of Patent: Sep. 17, 2019

(54) HIGHLIGHTS OF PREMIUM MULTIMEDIA CONTENT

(75) Inventor: Andrew Hey, Keighley (GB)

(73) Assignee: DISH TECHNOLOGIES LLC, Englewood, CO (US)

( * ) Notice: Subject to any disclaimer, the term of this patent is extended or adjusted under 35 U.S.C. 154(b) by 1270 days.

(21) Appl. No.: 12/700,430

(22) Filed: Feb. 4, 2010

(65) Prior Publication Data

US 2011/0191795 A1    Aug. 4, 2011

(51) Int. Cl.
*H04N 5/445*     (2011.01)
*H04N 21/45*     (2011.01)
*H04N 21/466*    (2011.01)
*H04N 21/482*    (2011.01)
*H04N 21/25*     (2011.01)
*H04N 21/258*    (2011.01)
*H04N 21/433*    (2011.01)
*H04N 21/442*    (2011.01)
*H04N 21/472*    (2011.01)
*H04N 21/6543*   (2011.01)
*H04N 21/475*    (2011.01)

(52) U.S. Cl.
CPC ........... *H04N 5/445* (2013.01); *H04N 21/251* (2013.01); *H04N 21/25891* (2013.01); *H04N 21/4334* (2013.01); *H04N 21/44222* (2013.01); *H04N 21/4532* (2013.01); *H04N 21/4667* (2013.01); *H04N 21/4668* (2013.01); *H04N 21/47211* (2013.01); *H04N 21/4826* (2013.01); *H04N 21/6543* (2013.01); *H04N 21/4755* (2013.01)

(58) Field of Classification Search
USPC ........................................ 725/86–104, 32–35
See application file for complete search history.

(56) References Cited

U.S. PATENT DOCUMENTS

| 6,526,577 | B1 * | 2/2003 | Knudson et al. ............... 725/40 |
| 8,260,950 | B1 * | 9/2012 | Bertz .................. H04L 65/4076 |
| | | | 709/231 |
| 8,424,043 | B1 * | 4/2013 | McClellen ........... H04N 21/233 |
| | | | 725/40 |
| 2002/0120931 | A1 * | 8/2002 | Huber et al. .................... 725/34 |
| 2002/0174430 | A1 * | 11/2002 | Ellis et al. ....................... 725/46 |
| 2003/0018980 | A1 * | 1/2003 | Gorbatov ............... H04N 5/782 |
| | | | 725/133 |

(Continued)

OTHER PUBLICATIONS

European Patent Office, First Examination Report for European Patent Application No. 11 153 409.5-1208 dated Apr. 20, 2018.

*Primary Examiner* — Michael R Telan
(74) *Attorney, Agent, or Firm* — Lorenz & Kopf LLP

(57) ABSTRACT

One embodiment may take the form of method for providing highlights of multimedia content that may be of interest to a user of a television system. The interest of a particular user of the television system may be obtained from a viewing history gathered about the user. From this information, one or more available multimedia programs may be identified as being of interest to the user. Highlights of such content, such as pay-per-view or other premium content, may be gathered and sent to or recorded on the receiver associated with the user such that the highlights may be presented to the user during use of the television system. The highlights may be viewed by the user through the television system and, if the user is interested in the content, may also purchase or otherwise access the highlighted programs.

12 Claims, 5 Drawing Sheets

(56) References Cited

U.S. PATENT DOCUMENTS

| | | | |
|---|---|---|---|
| 2004/0064831 A1* | 4/2004 | Abbott et al. | 725/1 |
| 2004/0163101 A1* | 8/2004 | Swix | G06Q 30/02 725/9 |
| 2005/0144635 A1* | 6/2005 | Boortz | 725/32 |
| 2007/0300253 A1* | 12/2007 | Kawai | G11B 27/034 725/38 |
| 2008/0092181 A1* | 4/2008 | Britt | 725/87 |
| 2008/0141307 A1* | 6/2008 | Whitehead | 725/46 |
| 2008/0172696 A1* | 7/2008 | Furusawa et al. | 725/46 |
| 2008/0255994 A1* | 10/2008 | Schnell | G06Q 30/02 705/52 |
| 2008/0276279 A1* | 11/2008 | Gossweiler et al. | 725/46 |
| 2009/0178071 A1* | 7/2009 | Whitehead | H04M 1/274583 725/15 |
| 2011/0123174 A1* | 5/2011 | Subramanian et al. | 386/250 |

\* cited by examiner

HIGHLIGHTS OF PREMIUM MULTIMEDIA CONTENT

TECHNICAL FIELD

The present invention relates generally to television systems, and more particularly to providing one or more highlights of a multimedia program.

BACKGROUND

Many digital cable, satellite and/or terrestrial television systems transmit an incoming television signal provided by a television provider to a receiver or other television receiver associated with a customer or user. The receiver, as part of the television system, may receive the encrypted signal and convert it into a signal that the user's television may recognize in order to display it to the user. Generally, a customer or user of the television system pays a monthly fee to view the content of the television signal broadcast by the television system.

In addition to the content provided by the television system for a monthly fee, many television systems also provide premium multimedia content to their users for additional purchase by the user. For example, many satellite and digital cable systems provide pay-per-view television events to their customers for purchase. Pay-per-view events are typically single television events that must be purchased by the customer prior to viewing, such as a sporting event or a movie that a customer may wish to spend money in addition to monthly fee to view. Other examples of premium content may be content broadcast on a pay channel that requires an additional monthly access fee to view or on-demand content that is continuously aired and may be viewed by the user upon payment of a fee. Generally, upon purchasing, the premium content is usually viewed on the purchaser's television or other display like any other program offered by the television provider.

However, because premium content is generally only accessible for viewing after the content has been purchased, many users may miss or be unaware of certain premium multimedia content offered by the television system that may be of interest to the user. For example, some users may be unaware that a particular pay-per-view sporting event is available, but would otherwise purchase the sporting event if the existence of the event is known to the user. Generally, such information is provided to a user through traditional advertising methods, such as television commercials, print ads, inserts in a monthly bill statement, and so on. However, it is often difficult to tailor advertisements of a particular premium content to those users that may be interested in the particular content. Thus, many televisions systems and providers spend significant amounts of money to advertise certain programs or content offered by the television system, while much of the advertisement of such programs goes to those users who are generally uninterested in the advertised program.

BRIEF SUMMARY

One implementation may take the form of a method for providing a highlight of a multimedia program to a user of a television system. The method may include the operations of obtaining at least one user preference for multimedia content, identifying a multimedia program that correlates to the at least one user preference, obtaining a highlight for the identified multimedia program and presenting the highlight to the user through the television system.

Another implementation may take the form of a television system for providing a highlight of a multimedia program to a user. The system may comprise a headend, a communication network coupled to the headend and configured to provide a communication path and a television receiver. Further, the television receiver may include a microprocessor and a computer-readable storage medium configured to store a computer-executable code that, when executed by the microprocessor, causes the television receiver to perform several operations. The operations may include obtaining a user preference, identifying one or more multimedia programs that correlate to the user preference and storing a segment of the one or more multimedia programs in the computer readable medium for presentation to the user.

Yet another implementation may take the form of a television receiver for providing a highlight of a multimedia program to a user. The television receiver may include a microprocessor and a computer-readable storage medium configured to store a computer-executable code that, when executed by the microprocessor, causes the television receiver to perform several operations. The operations may include obtaining a user preference, identifying one or more multimedia programs that correlate to the user preference and storing a segment of the one or more multimedia programs in the computer readable medium for presentation to the user.

DETAILED DESCRIPTION

One embodiment described herein may take the form of a method for providing one or more highlights of premium multimedia content that may be of interest to a user of a television system. One effect of such highlights may be to encourage the user to watch or purchase the premium content in its entirety. An interest profile for a particular user may be obtained from a viewing history of the user gathered by a device such as a television receiver or other component of the television system. From this information, one or more available multimedia programs may be identified as being of interest to the user. Highlights of such content, such as pay-per-view or other premium content, may be gathered and sent to or recorded on a television receiver, such as a set-top box, associated with the user such that the highlights may be presented to the user during use of the television system. The highlights may be gathered by a component of the television system, such as a headend, or may be recorded directly by the user's television receiver in response to the identified user preferences. In one embodiment, the highlights may be stored on a digital video recorder (DVR) associated with the user's receiver such that the user may access the DVR and select which highlights to view. In another embodiment, the highlights are presented to the user during viewing of one or more programs offered by the television system absent a command from the user.

As used herein, the term "television receiver" generally refers to any device capable of receiving, and/or processing a signal intended for display on a display device such as a television. Thus, a set-top box, cable box, appropriately configured television media server, computer and so on may all be "television receivers." Also, the term "television system" generally refers to any system capable of providing a television signal for viewing on a display device, such as a television or computer. Thus, television system may include a satellite television system, a digital cable system, a analog cable television system, television over the internet and so on.

Once a highlight is viewed, the user may purchase or otherwise access the associated premium content (referred to herein as "highlighted content"). In one embodiment, the highlighted content may made accessible by adding the identified content to a package of multimedia content available to the user through the television system. For example, the television system may respond to the purchase of a highlighted on-demand movie by providing access to the movie through the user's receiver. In another embodiment, the purchase of the highlighted program may create a recording timer to record and store the program to the DVR for later viewing by the user. In yet another embodiment, the highlighted program may be auto-downloaded to the user's receiver for viewing by the user at the user's convenience.

Figure 1:
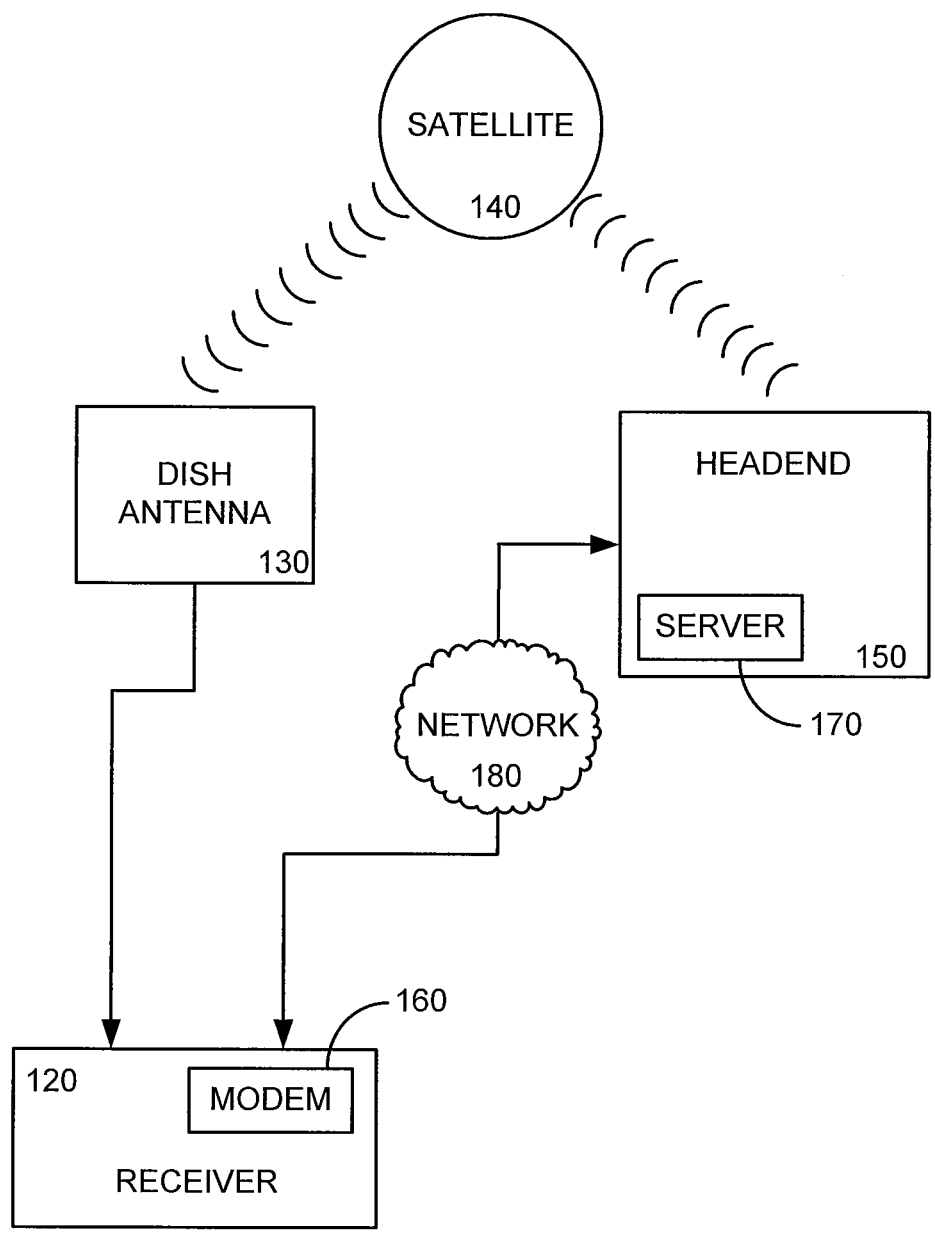
FIG. 1 depicts an exemplary satellite television system that may utilize a first embodiment to provide highlights of premium multimedia content to a user's receiver.

FIG. 1 depicts an exemplary satellite television system that may provide one or more highlights of multimedia content to a user. The satellite system is but one example of a system that may provide such highlights to the user. Alternatively, a digital cable satellite system or any other television system may also utilize the embodiments described herein.

The television system of FIG. 1 may include a television receiver, such as a set-top box, 120 that may receive an encrypted television signal and convert it into a signal that a user's television (or other display device) may recognize and display. In one implementation, the receiver 120 may receive the encrypted signal from a satellite or through a digital cable or network connection. Further, the encrypted television signal may be generated by a headend 150 and transmitted to the receiver 120. Generally, the headend 150 may be a master facility that receives television signals for processing and distribution to various television systems. In a satellite television provider, the headend 150 may transmit the audio/visual signal to a satellite 140 for redistribution to subscribers. Upon receipt, the satellite 140 may transmit the signal to a dish antenna 130 connected to the receiver 120 for decryption.

In a cable television system configuration, the headend 150 may transmit the television signal directly to the receiver 120 over a cable network connection (not shown). For example, the signal may be provided to the receiver 120 through a dedicated cable connected between the receiver and the headend 150. Alternatively, the signal may be provided over a network 180 connection, utilizing a modem 160 associated with the receiver 120.

The receiver 120 may also include a digital video recorder ("DVR") contained within, or otherwise connected to, the receiver. A DVR is a device that may record video and/or audio in a digital format to a disk drive or other memory medium within the device. Through the DVR, a user may record a television program to a memory medium so that the program may be viewed by the user at a more convenient time. In some cases, the memory medium may be a hard drive or flash device that is external to the receiver but configured to receive the digital information of the recorded program.

As stated above, the television system of FIG. 1 may be utilized to provide highlights of one or more multimedia programs in order to encourage a user to purchase or view the highlighted content. In one embodiment, the highlighted content is selected from premium content, such as a pay-per-view event or other pay to watch programs. However, the use of the term "premium content" herein is intended to embody any type of multimedia content provided by a television system, including, but not limited to, movie events, sporting events, concerts, television episodic programs, music channels, internet access, and so on. Further, premium content as used herein may also include multimedia content that is included in the user's standard package of available content. In general, the use of premium content to describe any type of multimedia content provided by a television system is used for convenience only and should not be considered as limiting to the embodiments described herein.

Figure 2:
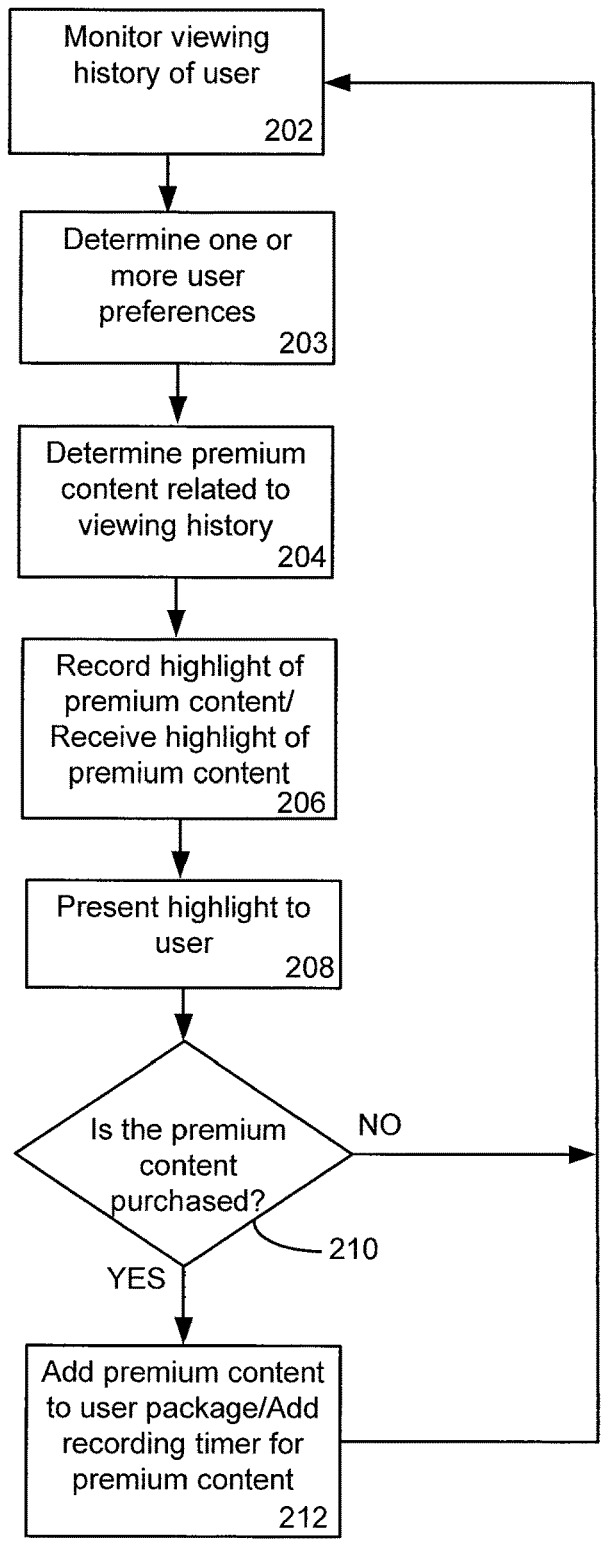
FIG. 2 is a flowchart depicting a method for a receiver to provide highlights of premium multimedia content to a user based on the user's viewing history.

FIG. 2 is a flowchart depicting a method for a television receiver to provide highlights of premium multimedia content to a user based on the user's viewing history. While the method of FIG. 2 is described in relation to a television receiver, it should be appreciated that one or more of the operations may be performed by any component of a television system, such as the headend or the user's television device.

The method of FIG. 2 may begin in operation 202, in which the receiver may monitor and/or record the viewing history of the user. In one embodiment, the receiver may monitor the user's viewing habits, such as the channel and program watched, and the time that the program is viewed, and store such information in a database. For example, the user may watch a particular program that airs on channel 2 from 7:00 pm to 8:00 pm on a particular date. This information may be collected by the receiver and stored in a database as part of the viewing history of the user. This monitoring and recording may continue for each program that the user views during use of the television system. As explained in more detail below, such information may be utilized by the receiver in operation 204 to determine the user's preferences to begin gathering highlights to present to the user.

Information other than channel and time may also be stored in a viewing history database by the receiver. For example, the receiver may store a program title, classification of a viewed program (such as "sports", "news", "movies"), one or more actors associated with a viewed program, a program rating, and so on. Further, the receiver may utilize an electronic program guide (EPG) associated with the television system to obtain information about a viewed program. Generally, the EPG is a program guide that is provided by the television system to the receiver and presented to the user to aid the user in selecting a particular program to view. In the embodiment where the receiver monitors the user's viewing history by maintaining a database of the user's viewed channels and times of viewing, the receiver may use this information and/or the EPG to determine which program aired at a stored time and channel.

Continuing the above example, the receiver may access the EPG to determine which program aired on channel 2 from 7:00 pm to 8:00 pm on the date the program was viewed. In this manner, the receiver may obtain information about a viewed program from the EPG. In addition to the program title, the EPG may also maintain other information associated with the program, thereby permitting the receiver to use the channel and time information to obtain several pieces of related information. Generally, any information about a program that identifies or classifies the program may be gathered and stored by the receiver in operation 202.

In operation 203, the receiver may use the viewing history gathered in operation 202 to determine one or more preferences of the user to identify one or more premium content programs that may be of interest to the user. Generally, to determine a preference of the user based on the user's viewing history, the receiver may compare one or more aspects of the viewed programs with information concerning the premium content. For example, the receiver may determine, after an analysis of a stored viewing history, that the user enjoys watching programs related to baseball. Upon determining the user's enjoyment of baseball programs, the receiver may then scan a list of available premium content or upcoming premium content to determine if any of premium content programs match this user preference in operation 204. For example, the television system may provide a daily pay-per-view baseball game to its customers for purchase. Based on the user's preference determined in operation 202 for baseball-related programming, the receiver may identify the pay-per-view baseball game as premium content that may be of interest to the user. Once the program is identified, an indicator or timer to record highlights of the baseball game may then be set, as described below in further detail in reference to operation 206. In this manner, the receiver may use the viewing history stored by the receiver to determine a viewing preference for the user and identify one or more premium content programs that correlate to the such preferences.

In an alternate embodiment, the user of the television system may provide his preferences directly to the television system. In one example of such an embodiment, the user may access a receiver interface (which may be displayed on the user's television) that facilitates the user specifying one or more preferences for televised content. The user may make his specifications by selecting one or more preferences from the interface using an associated remote control, for example. Thus, the user may select his preferences from a list of displayed preferences; the selected preferences are then stored by the receiver for use in determining premium content that may be of interest to the user. In another embodiment, the user may access a website associated with the television system to provide his preferences to the television system. The website may then provide the user's preferences to the television system such that the identified preferences may be stored by the headend or receiver of the television system. Generally, any manner in which the user actively selects one or more viewing preferences may be employed in the embodiments described herein. In addition, in some embodiments, the receiver may utilize both the user-specified preferences and a viewing history to determine the user's content preferences.

The information about available premium content programming that may match the user's preferences may be gathered from several sources. In one embodiment, the receiver may scan the EPG to create a list of premium content of interest, as well as to gather information about the premium content, such as content type (movie, sporting event, pay channel), genre, rating, actor and/or actresses that star in the program and so on. It should be noted that the EPG may be stored on the receiver and/or may be periodically received across the television system. This information may then be used by the receiver to compare to the user's preferences to determine if any of the gathered premium content programs match the identified preferences. In another embodiment, a separate database of available premium content and related information for the programs may be provided to the receiver from a source, such as a headend of the television system or on online database accessed by the receiver. Generally, the list of available premium content may include any content that is provided by the television system, such as movies, pay-per-view events, sporting events, episodic programs, concerts, and so on, as well as information related to each premium content program.

In addition, the television system may charge one or more third parties an additional fee to place a premium content program into the list of available content. For example, a third party that produces a pay-per-view event may provide a fee to the television system in exchange for placement of a program on the list of available premium content to be shown to the user.

Further, the matching of a premium content program to a user's preference may be as narrow or broad as needed. For example, a user preference for baseball may correlate to just baseball games, or may correlate to any sporting event maintained in the list of available premium content. Continuing the example, a user who watches a number of baseball games, or regularly watches such games, may be identified as enjoying sports in general in addition to, or instead of, baseball in particular. Likewise, multiple programs may be used to indicate a single preference. Thus, a user who watches both baseball and football games may be identified as one who prefers sports.

Similarly, a preference for a specific genre, such as comedy, may correlate to all manner of comedies or just the type of comedy watched (e.g., episodic comedies, situation comedies, comedy movies and so on). Generally, the matching of the user's preferences to the premium content may be achieved from any information gathered about the user and the premium content. In addition, the television system may be configured to provide highlights of a premium content program to the user regardless of whether a match to the user's preferences occurs. Thus, in this embodiment, a highlight of a program may be provided to every customer of the television system, regardless of the user's identified preferences.

In operation 206, the receiver may record or receive a highlight for the premium content identified in operation 204 based on the user's viewing history. The recording of a highlight of premium content is described in more detail below with reference to FIG. 3. In general, the recording of the highlight may be performed by a receiver in a manner similar to recording a program to a DVR associated with the receiver. Thus, the highlights may be recorded by the receiver and stored on a DVR associated with the receiver or may be stored elsewhere within the receiver. Once recorded, the highlights may be presented to the user during use of the television system, as discussed in further detail below in relation to operation 208.

In another embodiment, rather than record the highlights, the receiver may receive one or more highlights of the identified premium content from a remote source. In such an embodiment, the identified premium content that matches one or more of the user's preferences may be provided by the receiver to another component of the television system.

For example, the receiver may provide the identified content to a headend. Upon receipt, the headend may acquire one or more highlights related to the identified content and provide such highlights to the receiver. This operation is described in more detail below with reference to FIG. 4. In one example, the highlights may be provided to the receiver over the satellite of the television system. Alternatively, the receiver may also obtain the highlights from a network through an associated modem or other network connection.

Once recorded or received, the receiver may present the highlights of the identified premium content to the user in operation 208. Highlights may be accessible from a user's list of recorded media, may be shown as an advertisement for purchase or viewing of the premium content, or may be added or appended to another program. As can be seen, this presentation may take many forms. As yet another option, the highlights may be presented to the user without an input from the user, such as upon start-up or shut-down of the receiver or when the user changes channels during use. In general, the highlight may be presented to the user in any manner and on any device through which the user views television programming, such as a television, computer, mobile device and so on.

In yet another embodiment, the highlights may be presented to the user before, during or directly following another program viewed by the user, similar to a "bumper" advertisement. In this embodiment, the user may be viewing a program on the television system. During a break in the program, such as a commercial break or when the program has ended, the highlight for the identified premium content may be presented to the user to encourage the user to purchase or view the highlighted program. Further, the bumper highlight may be associated with one or more aspects of the program that is being viewed. For example, a bumper highlight for a comedic premium program may be shown while the viewer is watching a comedy-related program. Similarly, a bumper highlight for a dramatic pay-per-view movie may be shown directly following a dramatic movie viewed by the user. In another example, a bumper highlight for premium content that stars a particular actor may be presented to the user directly following a program that also stars that same actor. Such bumper highlights may be presented to the user following a live airing of a related program or when the user views a related program from the DVR of the television system.

Still with respect to operation 208 and as an alternative, one or more associated interactive programs may also be executed by the receiver and accompany the presented highlights. The interactive programs may provide an interface to the user to facilitate the purchase or selection of the highlighted premium content. For example, during the presentation of the highlight, the receiver may execute an interactive program that offers the user an opportunity to purchase or view the highlighted premium content. This interactive program may instruct the user to press a particular button on the user's remote control to purchase the program, or may instruct the user to call the television provider to order the highlighted premium content. In another embodiment, the interactive program may allow the user to access more details about the highlighted program, such as air dates, purchase price, channel, times of airing and so on. Generally, the interactive program may include any information and/or method to facilitate the purchase of the highlighted premium content by the user.

In those embodiments that include an interactive program, the receiver may determine, in operation 210, if the user provides an indication to the receiver to purchase the highlighted premium content. As mentioned, the interactive program may allow the user to purchase the highlighted premium content through the television system's remote control or through another interface. Thus, if the receiver determines that the user has not selected the highlighted premium content, the method may return to operation 202 to continue monitoring the user's viewing habits to determine or amend the stored user preferences and to continue presenting highlights of identified premium content to the user.

If it is determined that the user purchased the premium content, an indication of such purchase may be sent by the receiver to the television system to process such a request. In one embodiment, the receiver may send the user's request to purchase the content over a network to the headend, where the purchase request may be processed and the purchased content may be added to the user's package of available content. In another embodiment, the request to purchase may sent by the receiver to a third party that processes the request for the premium content. Alternatively, the user may place a telephone call to the television provider or the third party to purchase the highlighted premium content.

If the receiver determines that the highlighted premium content is purchased in operation 210, then the receiver or another component of the television system may add the purchased premium content to the user's available television package in operation 212. As mentioned above, the highlighted premium content may include single events, such as pay-per-view concerts or sporting events, or may include recurring events, such as several related sporting events (i.e., every game of an ongoing football league) or premium episodic programs. In addition, the premium content may also include a pay channel, such as "HBO®" or "Starz®". If the premium content is a pay channel, than the pay channel may then be made available to the user upon processing of the request for purchase. Similarly, a video on demand program may also become available to the user upon processing of the user's purchase of the content. In addition, in those instances where the premium content is upcoming, the receiver may set a recording timer to record the event. Such a recording timer may be similar to a recording timer set by the user to record an upcoming program to the DVR. In general, once the premium content is purchased by the user, the premium content becomes available for viewing by the user through the television system. Further, in an alternate embodiment, the identified content may be recorded to the DVR regardless of purchase by the user and activated for viewing when the content is purchased by the user.

Figure 3:
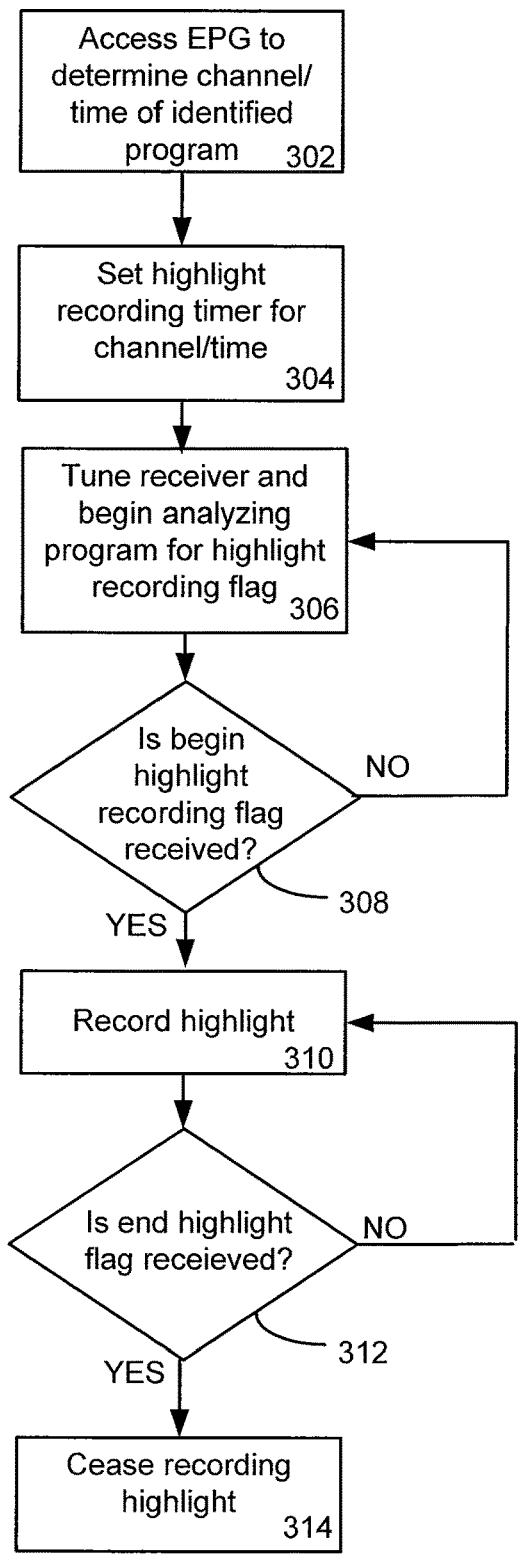
FIG. 3 is a flowchart depicting a method for recording a highlight of a multimedia program utilizing one or more recording flags associated with the program.

As mentioned above with reference to operation 206, the highlights for the premium program may be recorded by the receiver or provided by another component of the television system to the receiver for presentation to the user. FIG. 3 is a flowchart depicting a method for displaying highlights that have been recorded to a receiver. In general, the highlights are flagged for recording by the receiver with one or more recording flags that are present in the premium content received by the receiver from the television system.

The recording of a highlight of an identified premium content program may begin in operation 302 as the receiver accesses the EPG to determine a channel and time frame at which the identified premium content airs. Once the channel and time are determined, the receiver may create a highlight recording timer in operation 304 to record a highlight from the identified premium content at the identified channel and time. The highlight recording time may be similar to a recording timer associated with the DVR to record on upcoming program.

When the identified premium content airs, the television receiver may tune to the identified channel to begin recording the highlight of the premium content in operation 306. Upon tuning to the appropriate channel, the receiver may begin analyzing the incoming premium content for a highlight recording flag associated with the premium content. In certain embodiments, the premium content provided to the receiver by the television system may have one or more flags embedded therein. When the content is streamed to and received by the receiver, the flags may signal to the receiver record a segment of the premium content and store it as a highlight. Generally, a first flag may initiate the recording process and a second flag may terminate it. A flag may be inserted into the premium content by the television system or by a provider of the premium content. Generally, the flags may take any form that is recognized by the receiver, such as a data bit or pixel flag embedded within the television stream that indicates to the receiver to begin recording the premium content. As one example, data may be embedded in the closed captioning signal that initiates and/or turns off recording of a highlight.

In another embodiment, the flag may be broadcast to the receiver separate from the television stream containing the premium content and stored by the receiver for use when recording the highlight.

The receiver may determine if the "begin highlight recording flag" has been detected in operation 308. If the flag has not been encountered, the method may return to operation 306 so that the receiver continues to analyze the incoming television signal for the begin highlight recording flag. However, if the begin highlight recording flag is detected by the receiver in operation 308, then the receiver may begin recording the highlight of the premium content in operation 310.

In one embodiment, the receiver may store the recorded portion of the premium content to a computer-readable medium contained within the receiver. In another embodiment, the receiver may provide the recorded portion to a storage device associated with the receiver. In still another embodiment, the receiver may store the recorded highlight to an external hard drive associated with the receiver. In general, however, the receiver may record and store the highlight to any computer-readable medium accessible when the highlight is presented to the user.

In operation 312, the receiver may continue analyzing the incoming television signal to determine if an "end highlight recording flag" is received or detected. The end highlight recording flag may be similar in implementation to the begin highlight recording flag. If the end highlight recording flag is not received, the method may return to operation 310 such that the receiver continues recording the highlight of the premium content. If the receiver detects or encounters the end highlight recording flag in operation 312, then the receiver may cease recording the highlight of the premium content in operation 314.

Through this method, the receiver may record a segment of a premium content program as a highlight of the program to present to the user. Once recorded, the highlight may be stored on the receiver or on a DVR associated with the receiver and presented to the user as described above to encourage the user to purchase or view similar premium content.

Generally, the above operations to record the highlight of the premium content occurs without the user's knowledge. For example, the recording timer may be configured to record the highlight when the user is not using the receiver, such as late at night or when the receiver is off. In some embodiments, the receiver may include more than one tuner so that the receiver may record the highlight on the unused tuner so as not to interrupt the user's use of the receiver. In these embodiments, the tuner used to record the highlight is generally unavailable to the user during recording to prevent the user from viewing the premium content without first purchasing the content. Further, the recorded highlight may be made available directly to the user upon recording, or may be presented to the user without selection.

In another embodiment, the receiver does not utilize recording flags to determine the parameters of the highlight segment of the premium content. Rather, in this embodiment, the recording timer may be configured to begin recording a segment of the premium content that is identified based on the elapsed running time of the program. For example, the recording timer may be configured to record a segment of the premium content beginning at the ten minute mark into the airing or run of the program. Thus, after the program has been running for ten minutes, the receiver may begin recording the premium content. Similarly, the recording timer may include a stop time associated with an elapsed amount of running time of the content. For example, the receiver may record the highlight of the premium content starting at the ten minute mark and ending at the 13 minute mark. As should be appreciated, recording timers generally include a stop and start time that define the running time of a program. Similarly, the recording timer for a highlight of a premium content may include a start and end time based on the run time of the premium content. In an alternate embodiment, the start and stop time for the recording timer may be based on a universal clock. For example, the recording timer may be set to record from 7:10 pm to 7:13 pm to record the premium content highlight.

The method described above in FIG. 3 may be still used in the embodiment that sets a recording timer rather than utilizing one or more recording flags. However, in this embodiment, operations 306 and 308 may be bypassed such that the receiver begins recording the premium content highlight at the set time, rather than analyzing the incoming stream for a recording flag. Similarly, operation 312 may also be removed as the receiver ceases recording the premium content highlight at the set stop time.

Figure 4:
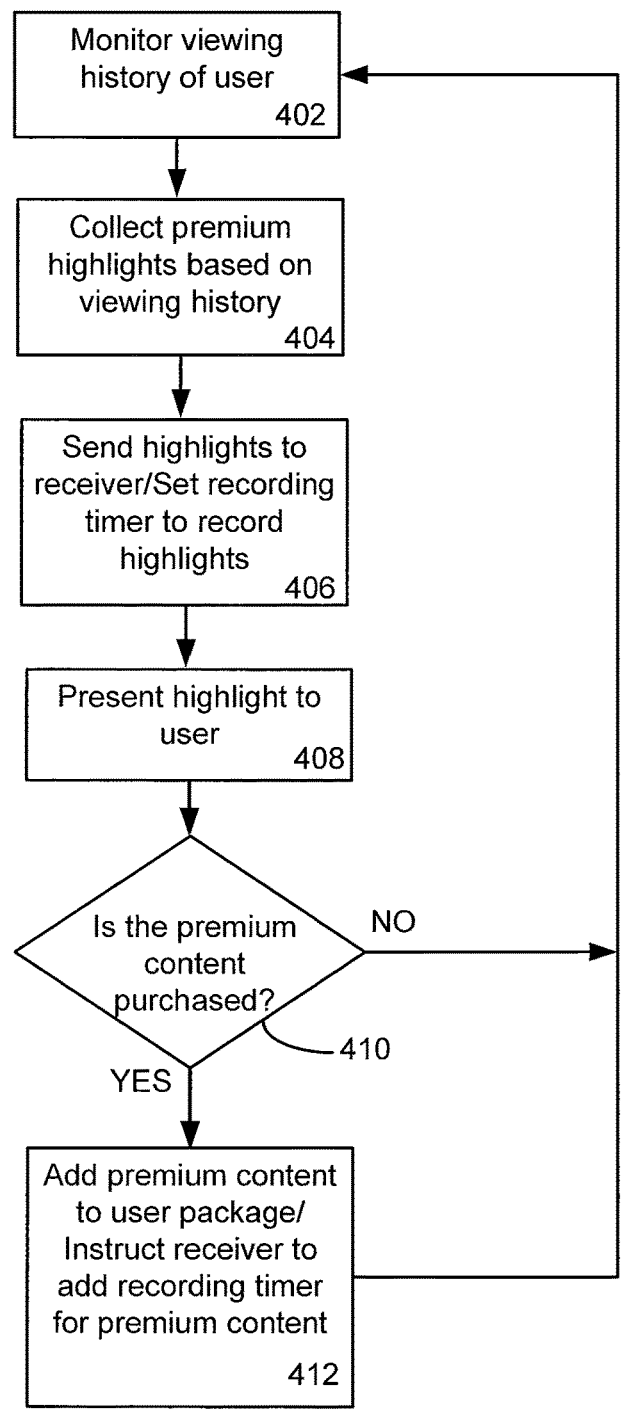
FIG. 4 is a flowchart depicting a method for a headend of a satellite television system to provide highlights of premium multimedia content to a user based on the user's viewing history.

In addition to the receiver, other components of the television system may also provide highlights of premium content to a user. For example, FIG. 4 is a flowchart depicting a method for a headend of a satellite television system to provide highlights of premium multimedia content to a user based on the user's viewing history. Many of the operations of the method of FIG. 4 are similar to the operations described above with reference to FIG. 2. As such, the embodiments described above with reference to the receiver of the television system may also apply to the headend.

Beginning in operation 402, the headend may monitor and store the viewing history of a user of the television system to determine one or more user preferences. In one embodiment, this information may be collected by a receiver and sent to the headend for processing to determine user preferences. In another embodiment, the viewing history of the user may be collected by the headend itself, in a similar manner as described above with reference to FIG. 2.

Once one or more preferences of the user are determined, the headend may collect highlights of one or more premium content programs that match the user's determined preferences in operation 404. To collect the highlights, the headend may maintain a database of highlights for one or more premium content programs that are offered by the television system. Thus, when a premium content program is matched to the user's preference, the headend may access the database of highlights to obtain a highlight that corresponds to the identified premium content. In other embodiments, the headend may obtain the highlights from a remote source, such as a network storage device, a third party (such as the provider of the premium content), or a remote storage device. In yet another embodiment, the headend may record the highlight in a similar manner as described above.

Once the one or more highlights are collected, the headend may transmit the highlights to the user's receiver in operation 406. The transmission of the highlights to the receiver may occur in several ways. For example, the headend may embed the highlights into a television signal that is transmitted to the receiver. Further, the headend may transmit the highlights to the receiver in the television signal with a header that instructs the receiver to store the highlight until the user accesses the highlight and the receiver presents the highlight to the user. In another embodiment, the headend may transmit the highlights to the receiver in a data packet that is separate from the television signal. In yet another embodiment, the highlight may be included as a bumper to one or more programs transmitted by the headend, as described above. Generally, any transmission of the collected highlights to the receiver such that the highlight may be presented to the user or stored is envisioned.

In addition, as mentioned above, some highlights may be gathered by the receiver by recording a segment of the program. In the case where the highlight of the identified premium content program is recorded by the receiver, in operation 406 the headend may send an instruction to the receiver to create a recording timer to record the identified highlight. Thus, the headend may identify the premium content that matches the user's preferences and may instruct the receiver to record the highlight for presentation to the user. Such a recording timer may include start and stop times for recording or may analyze the incoming television signal for start and stop recording flags, as explained.

In operation 408, the gathered or recorded highlight of the premium content may be presented to the user in any of the manners previously described.

Similar to the embodiments described above, the premium content highlight may include an interactive program that allows the user to purchase the premium content. Thus, the headend may determine if the premium content is purchased in operation 410. This determination may occur when the receiver sends a purchase request to the headend, or the headend receives a purchase authorization from a third party. If it is determined that the premium content was not purchased, the method may return to operation 402 such that the receiver continues to monitor the viewing history of the user to add to or amend the user's preferences.

Alternatively, if it is determined that the premium content is purchased, the headend may add the purchased content to the user's television package in operation 412. In addition, the headend may also instruct the receiver to set a recording timer to record the premium content when it airs.

Figure 5:
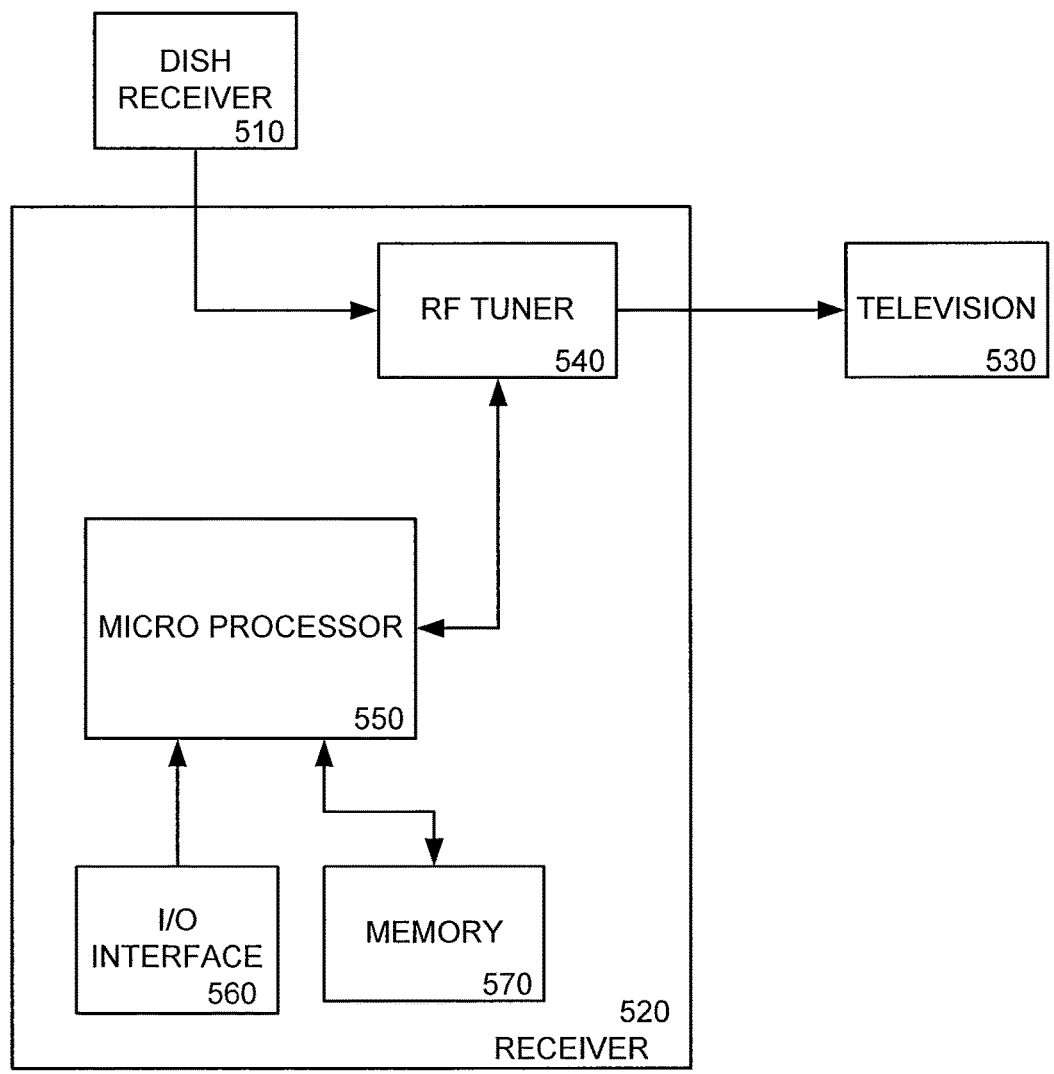
FIG. 5 is a block diagram illustrating an example of a receiver which may be used in implementing embodiments described herein.

FIG. 5 is a block diagram illustrating an example of a receiver 520 which may be used in implementing embodiments described herein. The receiver 520 may receive a transmitted television signal from a satellite dish receiver 510 and may transmit a translated signal to a user's television 530 for display to the user. The television signal may be received at the receiver 520 by a radio frequency (RF) tuner 540. The RF tuner 540 may translate the received signal and provide that signal to the user's television 530. Although not shown, the satellite dish receiver 510 may include a low noise block (LNB) or other components to decrypt and transmit the received television signal. Similarly, the receiver 520 may include more or fewer components as those shown. It should be appreciated, however, that the receiver 520 may receive the signal from any source, including, but not limited to, a satellite, the internet, a digital cable or any other terrestrial-based communication network.

Further, the receiver 520 may provide an interface to the user, through the user's television 530, including one or more user classifications as described above. To provide the interface to the user, the receiver 520 may include a microprocessor 550 coupled to memory 570, as described in more detail below. The receiver may also include an input/output (I/O) interface 560 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 550. The I/O device may be utilized by a user to provide inputs and commands to the receiver 520 to control the interface.

System 500 may include a dynamic storage device, referred to as memory 570, or a random access memory (RAM) or other devices coupled to the receiver 520 for storing information and instructions to be executed by the microprocessor 550. Memory 570 also may be used for storing temporary variables or other intermediate information during execution of instructions by the microprocessor 550.

According to one embodiment, the above techniques may be performed by a receiver 520 in response to microprocessor 550 executing one or more sequences of one or more instructions contained in memory 570. These instructions may be read into memory 570 from another machine-readable medium, such as a storage device. Execution of the sequences of instructions contained in memory 570 may cause the microprocessor 550 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 570. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIGS. 2 through 4 are illustrative only. Alternative embodiments may add operations, omit operations, or change the order of operations without affecting the spirit or scope of the present invention.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A television receiver for providing a highlight of a multimedia program to a user of a television system including a headend, the television receiver comprising:
   a microprocessor; and
   a computer-readable storage medium, the computer readable storage medium storing a computer-executable code that, when executed by the microprocessor, causes the television receiver to perform the operations of:
   transmitting to the headend at least one of the group consisting of (i) user preferences for multimedia content and (ii) information from which the user preferences for multimedia content can be determined;
   in response to transmitting the user preferences or the information to the headend, receiving from the headend instructions to collect and store highlights for premium multimedia programs correlating to the user preferences by recording selected portions of the premium multimedia programs specified by the instructions; and
   after receiving instructions to collect and store the highlights from the headend, automatically and without requiring input from the user (i) collecting and storing the highlights in the computer-readable storage medium and (ii) subsequently presenting the highlights to the user of the television system.

2. The television receiver of claim 1 wherein, in receiving from the headend instructions to collect and store highlights, the television receiver searches for embedded recording flags in an incoming television stream transmitted from the headend and containing the premium multimedia programs.

3. The television receiver of claim 1 wherein, when receiving from the headend instructions to collect and store highlights, the television receiver receives recording flags broadcast by the headend separately from a television stream containing the premium multimedia programs.

4. The television receiver of claim 1 wherein the instructions from the headend comprise recording timer data defining start and end times of the highlights of premium content.

5. The television receiver of claim 1 wherein the computer-executable code further causes the television receiver to perform the operations of:
   storing a first premium multimedia program in its entirety in the computer readable medium regardless of purchase by the user; and
   activating the first premium multimedia program for viewing only when the content is purchased by the user after presentation of a highlight corresponding to the first premium multimedia program.

6. A method for providing highlights of premium content to a user of a television system including a receiver and a headend, the premium content comprising pay to watch programs, the method comprising:
   at the headend, obtaining one or more viewing preferences of the user by receiving information from the receiver indicative of the viewing preferences or by analyzing the viewing history of the user to determine the viewing preferences;
   at the headend, identifying highlights of premium content matching the viewing preferences of the user; and
   at the headend, after receiving instructions to collect and store the highlights, automatically and without requiring input from the user (i) collecting and storing the highlights in a computer-readable storage medium and (ii) subsequently presenting the highlights to the user of the television system wherein the highlights comprise: highlights of premium content by a recording of specified segments of the premium content for presentation to the user of the television system.

7. The method of claim 6 further comprising:
   transmitting instructions to the receiver, to automatically and without requiring input from the user, embed recording flags in a television signal containing the premium content and transmitted to the receiver by the headend.

8. The method of claim 6 further comprising:
   transmitting instructions to the receiver, to automatically and without requiring input from the user, to transmit from the headend to the receiver, recording flags broadcast separately from a television stream containing the premium content.

9. The method of claim 6 further comprising, at the receiver, presenting the highlights of premium content to the user by appending at least one of the highlight to a program as a bumper, the program also correlating to the one or more viewing preferences of the user.

10. The method of claim 6 further comprising:
    at the headend, determining if a premium content program has been purchased by the user; and
    at the headend, adding the purchased premium content program to a television package of the user if determining that premium content program has been purchased.

11. The method of claim 10 further comprising, if determining that the premium content program has been purchased, sending instructions from the headend to the receiver to set a recording a timer to record the purchased premium content program.

12. The method of claim 6 further comprising: transmitting instructions to the receiver, to automatically and without requiring input from the user, to transmit from the headend to the receiver, recording timer data defining start and end times of the highlights of premium content.

* * * * *